Oct. 2, 1934.  M. H. HILL  1,975,151
CHAMFERING MECHANISM
Filed Dec. 31, 1931   2 Sheets-Sheet 1

INVENTOR
Maxwell H. Hill
BY Schlesinger
his ATTORNEY

Oct. 2, 1934.  M. H. HILL  1,975,151
CHAMFERING MECHANISM
Filed Dec. 31, 1931  2 Sheets-Sheet 2

INVENTOR.
Maxwell H. Hill
BY
his ATTORNEY

Patented Oct. 2, 1934

1,975,151

UNITED STATES PATENT OFFICE 1,975,151

CHAMFERING MECHANISM

Maxwell H. Hill, Rochester, N. Y., assignor to Gleason Works, Rochester, N. Y., a corporation of New York Application December 31, 1931, Serial No. 584,190

13 Claims. (Cl. 90—1)

The present invention relates to mechanism for chamfering the teeth of gears and particularly to mechanism for chamfering the teeth of longitudinally curved tooth bevel and hypoid gears.

In spiral bevel and hypoid gears, there are acute angular corners formed at opposite ends of the teeth at the juncture, in one case, of the concave side and outer end surfaces of the teeth and, in the other case, at the juncture of the convex side and inner end surfaces of the teeth. If these corners are not removed, they have a tendency to break off in use, even though the gears may have been hardened, and the chips caused by the breakage may get in between the teeth of the gears, causing noise, wear and oftentimes serious damage. It is, therefore, the practice in gear cutting shops to chamfer the ends of the teeth of spiral bevel and hypoid gears before they are placed in use.

Various methods for producing the necessary chamfer are employed in different plants. In some, it is the practise to file off the offending corners of both ends of the teeth manually. In others, the large ends of the teeth are chamfered in a hobbing process with specially designed hobs, but as the hobbing operation does not lend itself readily to the chamfering of the corners at the small ends of the teeth, filing or some other method must be resorted to, if these corners are to be removed. A manual operation is, of course, very costly.

In my pending application No. 522,538 of March 14, 1931, there is disclosed an attachment for chamfering the teeth of bevel gears at the same time that they are being rough cut, but this attachment has been constructed to chamfer one end of the teeth only. In my application, Serial No. 556,135, there is disclosed an organized machine for simultaneously chamfering both ends of the teeth of spiral bevel and hypoid gears.

The purpose of the present invention is to provide an improved and simplified form of chamfering mechanism which may be employed either in an attachment for a gear cutting machine or in a machine built solely for chamfering and by means of which both ends of the teeth of either a spiral bevel or hypoid gear or pinion can be chamfered simultaneously.

The present invention may be practised in various ways but, preferably, the chamfering is done by simultaneously swinging a pair of chamfering tools across the corners of the teeth in such way that they move simultaneously in opposite directions and cut from the opposite ends of the teeth inwardly along lines oblique to the tooth sides. The tools are preferably positioned to swing about axes approximately perpendicular to the root plane of the gear being chamfered.

The invention has been illustrated as embodied in an attachment for a spiral bevel gear rougher of standard construction. In this use, the chamfering mechanism and the cutter, which cuts the tooth spaces of the blank, will preferably operate alternately in accordance with the principles broadly disclosed in my co-pending application No. 522,538 above mentioned, so that a tooth space will be first cut in the gear blank and then chamfered.

Figures 1, 2, 7:
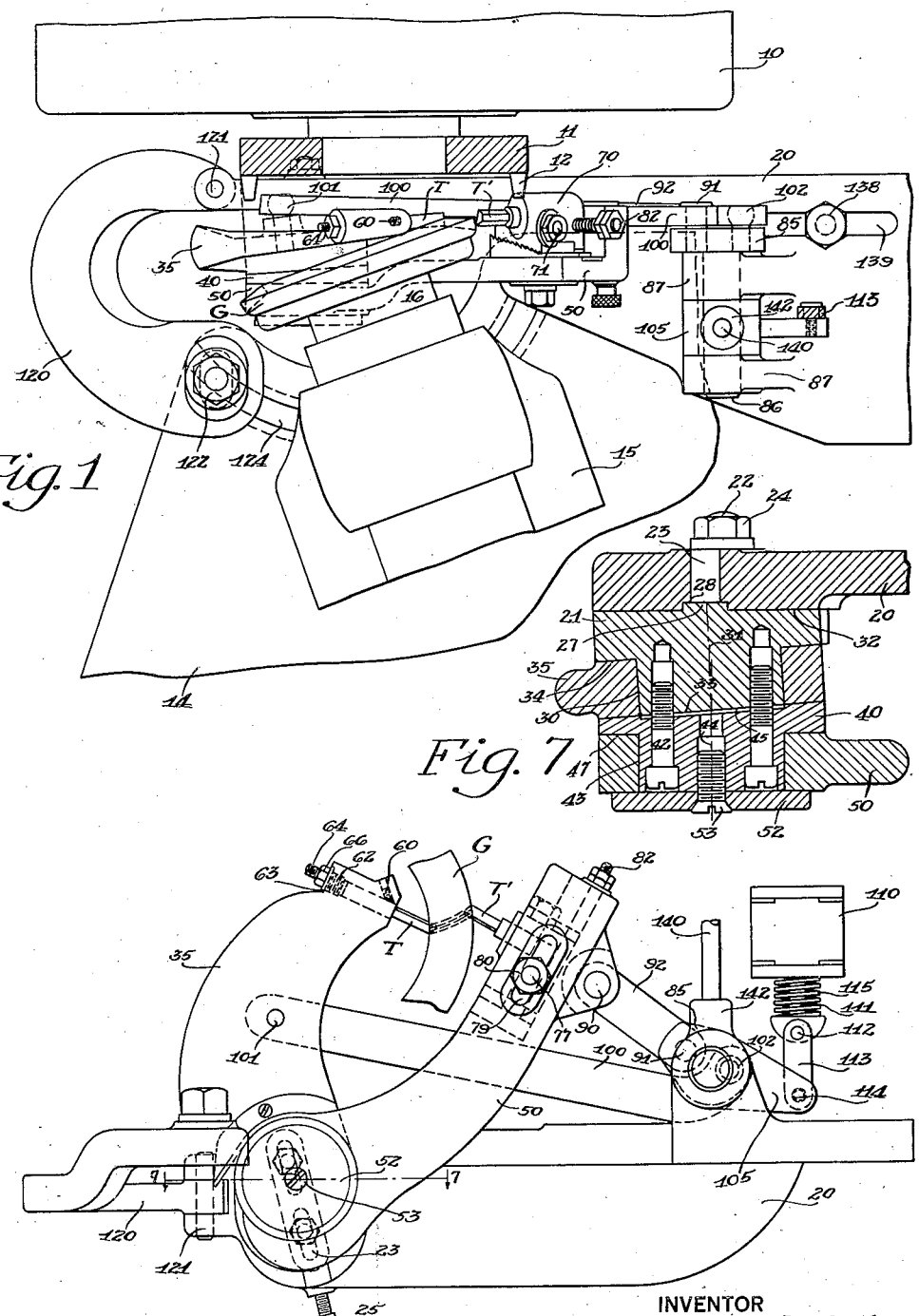
Figure 1 is a fragmentary plan view of a standard spiral bevel gear roughing machine provided with a double-ended chamfering mechanism constructed according to the present invention.
Figure 2 is a view looking at the blank and chamfering mechanism from the rear.
Figure 7 is a section on the line 7—7 of Figure 2 but on an enlarged scale.

In the drawings, 10 designates the upright or cutter support of a face-mill gear cutting machine such as disclosed, for instance, in the patent to E. W. Bullock et al., No. 1,351,200 of August 31, 1920. 11 designates the tool for cutting the tooth spaces in the blank, a rotary face-mill gear cutter of known construction. Blades of this cutter are indicated at 12. 14 designates the base or frame of the machine and 15 the work head. The gear blank G which is to be cut and chamfered, is secured to the work spindle 16 of the machine in any suitable manner.

20 designates a bracket or support on which is mounted the chamfering mechanism. There is a bearing block 21 secured to the bracket 20 by studs 22 (Figs. 3 and 7) which are threaded into the bearing block 21 and pass through slots 23 in the bracket 20 so that the bearing-block 21 may be adjusted with reference to the bracket 20. The bearing-block is secured in any adjusted position by the nuts 24 which thread onto the studs 22. A fine adjustment of the bearing-block 21 on the support 20 is possible through use of the adjusting screw 25 which threads into the support 20 and abuts at its inner end against one of the studs 22. The front face of the bearing block 21 is formed with a tongue 27 that is adapted to engage in a groove 28 formed in the support 20 and communicating with the slots 23. This tongue serves to guide the bearing-block in its adjustment on the bracket 20.

The bearing block 21 is formed with a cylindrical hub portion 30 on which the arm 35 is rotatably mounted. The rear face 33 of the block and the seat or shoulder 34 are parallel to one another, but inclined to the front face 32.

There is an arm 35 journaled on the hub portion 30 of the bearing-block for oscillation about an axis 31 perpendicular to the faces 33 and 34. The tool T for chamfering the inner ends of the teeth of the gear blank G is secured in the arm 35.

A second bearing-block 40 is secured to the bearing block 21 by screws 42. This bearing-block 40 is formed with a cylindrical hub portion 43, the axis 44 of which, when the bearing-block is in position, is inclined to the axis 31 of the bearing-block 21. The front face 45 of the bearing-block 40 is inclined to the axis 44 at an angle such that the two faces 45 and 33 of the two bearing-blocks bear on one another. The seat or shoulder 47 of the bearing-block 40 is perpendicular to the axis 44 of the hub portion of this block.

The arm 50 which carries the tool T' for chamfering the outside ends of the teeth of the gear blank G, is journaled on the hub portion 43 of the bearing block 40. The arm 35 is secured against axial movement on the bearing-block 21 by the bearing-block 40, when the latter block is secured in position, while the arm 50 is held against axial movement on its bearing block 40 by the cap member 52 which is secured to the bearing-block 40 by the screw 53.

Figure 6:
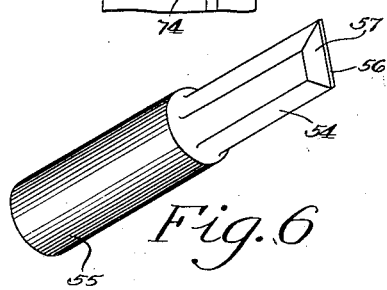
Figure 6 is a perspective view of one of the chamfering tools.

The two chamfering tools are alike. Each is formed with a cylindrical post or shank 55, as shown in Figure 6. The cutting portion 54 of each tool is generally trapezoidal in cross section and the front face 57 of each tool is given a suitable rake or shear to form the cutting edge 56 of the tool.

The inside chamfering tool T is secured in a socket or aperture in the tool arm 35 by the set-screw 60. There is a sleeve 62 threaded in the arm 35 and formed with a collar or flange 63. A pin 64 threads into the sleeve 62 and is adapted to contact with the inner end of the tool T. By adjusting the pin 64 in the sleeve 62, then, the tool T can be adjusted for length in the arm 35. A lock-nut 66 is provided to secure the pin 64 in any adjusted position.

Figure 4:
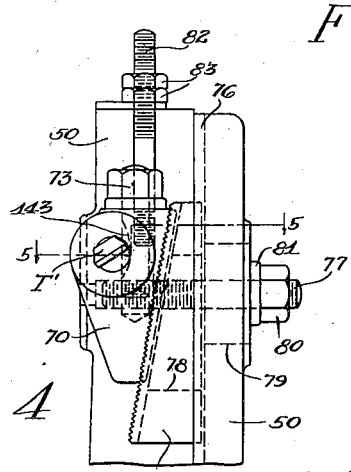
Figure 4 is an end view, showing the mounting of the tool for chamfering the outside ends of the teeth.
Figure 5:
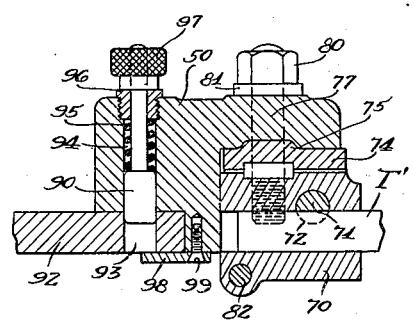
Figure 5 is a section through the tool support on the line 5—5 of Figure 4.

The outside chamfering tool T'' is adapted to be secured in a tool-block 70 (Figs. 4 and 5) by a lock-stud 71. The stem of this lock-stud is formed with a semi-circular recess 143 somewhat larger in diameter than the diameter of the shank-portion 55 of the tool T'. When the nut 73 is tightened, one side of this recess 143 is forced against the tool shank and so the tool is locked in position. The block 70 is adjustably mounted upon a wedge-shaped block 74. The wedge-shaped block 74 is in turn adjustable upon the tool arm 50, the block 74 being formed with a guide or tongue 75 that is slidable in the groove 76 formed in the tool arm 50.

The tool block 70 is secured in adjusted position on the wedge-block 74 and this latter block is in turn secured in adjusted position on the tool arm 50 by a bolt 77 that threads into the tool block 70 and passes through aligned slots 78 and 79 formed in the wedge-block 74 and tool arm 50, respectively. The nut 80 and washer 81 serve to secure the bolt 77 in adjusted position. The opposed faces of the blocks 70 and 74 are serrated, as clearly shown in Figure 4, to more securely hold the block 70 in any position of its adjustment on the block 74. For fine adjustment, the screw 82 is provided. This is secured in a recess in the tool arm 50 and threads into the block 70. The nuts 83 thread on the screw 82 and are provided for the purpose of adjusting this screw and locking it in adjusted position. When the bolt 77 is loosened, therefore, the block 70 can be readily adjusted on the block 74 by rotation of the nuts 83.

The arms 35 and 50 are swung, respectively, about the axes 31 and 44 to impart the chamfering motion to the tools T and T'. To this end, they are connected to an oscillatory actuating member 85. This member has a shaft or post 86 formed integral with it and journaled in ears or lugs 87 which are formed on the support 20.

The outside arm 50 is connected with the actuating member by the pins 90 and 91 and the link 92. The pin 90 is in the form of a spring-pressed plunger which is adapted to engage in the hole 93 formed in the link 92 but can be retracted into the bore 94 of the arm 50 in order to disengage the link 92 from the arm. The spring 95 which is interposed between the head of the pin 90 and the nut 96 serves to hold the pin in engagement with the link 92. The nut 96 threads into the arm 50, closing the outer end of the bore 94. A knurled nut 97 is secured to the outer end of the pin 90 to provide a handy means for withdrawing the pin from the hole 93. A plate 98 is provided to hold the link in position when engaged by the pin 90. This plate is secured to the arm 50 by screws 99.

The inside arm 35 is connected to the actuating member 85 by a link 100 and pins 101 and 102. The pins 101 and 102 are secured in the arm 35 and the actuating member 85, respectively. Both are provided with spherical shaped heads engaging in correspondingly shaped holes or sockets in the link 100 so that the link 100 can move freely without binding in its pull on the arm 35.

When the chamfering mechanism is used in connection with a gear cutting machine, it is desirable to actuate the chamfering mechanism in time with the tooth cutting operation so that after each tooth space is cut, the ends thereof are chamfered. This allows the cutting and chamfering operations to be carried on at the same time and to be completed substantially simultaneously. Thus, the preferred method of operation when the chamfering mechanism is used on a gear cutting machine, will be to cut a tooth space in the blank, withdraw the cutter, chamfer the ends of the tooth space, then index the blank and begin the cycle anew.

Various means may be employed for actuating the chamfering mechanism in time with the cutting operation, as will be obvious to those skilled in the art. Thus, the arm 105 which is keyed to the shaft 86 might be rocked to impart the chamfering motion by either a crank or a cam driven in time with the feed cam of the gear cutting machine. Again the arm 105 might be oscillated from the movement of a fluid pressure actuated piston where the reversal of the piston is controlled from the movement of the cutter. One form of this latter type of actuating mechanism is disclosed in the rather highly organized gear cutting machine of the pending application of Robert S. Condon, Serial No. 583,895, filed December 30, 1931. For the sake of illustration, I have disclosed in the drawings an electrically operated actuating mechanism for rocking the chamfering tools. This mechanism includes the solenoid 110.

The core bar 111 of this solenoid is connected by the pin 112 with a link 113, which, in turn, is pivotally connected by the pin 114 with the arm 105. The coil spring 115 normally holds the arms 35 and 50 and the chamfering tools carried thereby in inoperative position. When the solenoid 110 is energized, however, the arm 105 is rocked to pull the tools T and T' together to effect the chamfering operation. Any suitable electrical connection may be employed to energize the solenoid 110 each time the face-mill cutter 11 is withdrawn from engagement with the gear blank.

The support 20 for the chamfering mechanism may be secured in any suitable manner to the base 14 of the machine. For the purposes of greater rigidity, a brace may be employed for the outer end of the support 20. Such a brace has been shown in the drawings and indicated at 120. It is pivotally connected by the pin 121 with the support 20. It can be adjustably secured to the work head base 14 by the T-bolt 122. The head of this bolt may engage in the arcuate T-slot 124 such as is ordinarily provided in the head base of bevel gear cutting machines for receiving the T-bolts by which the work head itself is secured in any position of its angular adjustment on the base of the machine.

Figure 3:
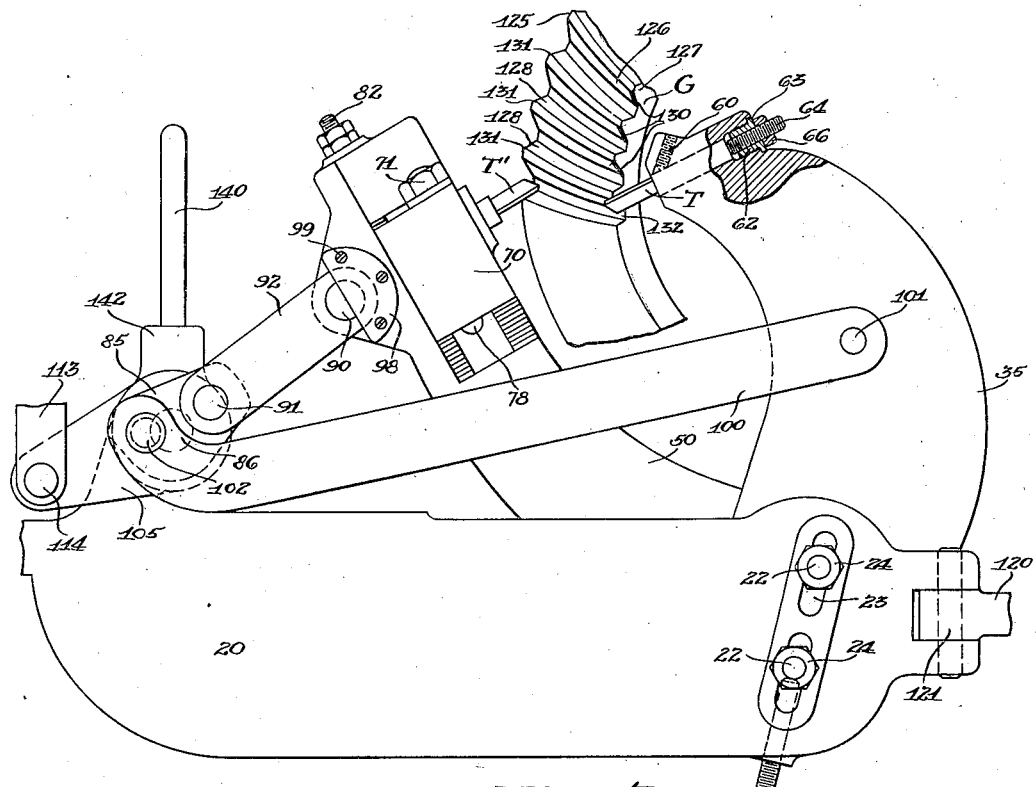
Figure 3 is a view on a slightly enlarged scale, looking at the blank and chamfering mechanism from the front.

The action of the chamfering tools is clearly shown in Figures 2 and 3. A spiral bevel or hypoid gear G has longitudinally curved teeth such as indicated at 125. The convex sides 126 of these teeth form an acute angle with the inner end faces 127 of the teeth, while the concave sides 128 of the teeth form an acute angle with the outer ends of the teeth. It is, accordingly, necessary to remove the corners of the teeth at the juncture of its convex sides and inner ends of the teeth and it is also necessary to remove the corners of the teeth at the juncture of the concave sides and outer ends of the teeth. When the arm 105 is rocked by energizing the solenoid 110, the actuating member 85 is rocked to cause the tool arms 35 and 50 to be pulled together by reason of the link connection between the two tool arms and the actuating member 85. The tools swing, therefore, about their respective axes 31 and 44, taking cuts at opposite ends of the tooth spaces of the blank and removing the offending corners. In Figure 3, several tooth spaces of the blank are shown already cut, and the inside corners 130 and outside corners 131 of these tooth spaces have already been chamfered. The chamfering tools T and T' are shown in the act of chamfering the opposite ends of the tooth space 132 which has just been cut by the face-mill 11.

The axis 31 about which the inside tool is swung is inclined to the axis 44 about which the outside tool arm 50 swings for the purpose of providing the maximum clearance between the arm 35 and the blades 12 of the face-mill cutter 11. In a machine where greater clearance is obtainable or in a machine designed only for chamfering, the parts might be constructed so that the inside and outside tools might swing about the same axis. It is to be noted that the toggle linkage provided for actuating the tool arms imparts a powerful cutting stroke to the chamfering tools and in ordinary cases but a single pass of the chamfering tools is required to remove the offending corners of the teeth to the extent desired.

It is desirable that the chamfering tools cut from the root surface of the teeth to the tip surface thereof so as to remove the offending corners of the teeth completely. For this reason, it is desirable to adjust the parts so that the axes 31 and 44 about which the tools swing are approximately perpendicular to the root surface of the gear blank to be chamfered. The outside cutting tool can be adjusted so as to swing exactly about an axis perpendicular to the root plane of the teeth of the blank, but due to the necessity for clearing the face mill cutter 11 and the consequent inclination of the axis 31, the inside cutting tool T can only be positioned to swing about an axis 31 approximately perpendicular to the root plane. In adjusting the tools, the support 20 is first adjusted bodily to position the inside tool T in the correct cutting position and then the outside cutting tool T' is adjusted with reference to the inside tool so as to bring it in the correct cutting position, also.

The inside cutting tool T' is adjusted so as to swing about an axis approximately perpendicular to the root plane of the blank and chamfer the teeth from root to tip by adjusting the support 20 angularly on the work head base 14 in conformity with the angular adjustment of the work head 15 thereon. To effect this adjustment, the bolt 122 which secures the brace 120 to the work head base and the bolts 138, of which only one is shown, which secure the support 20 to this base, can be loosened and the support and brace adjusted to the desired angular position after which the bolts are tightened again.

After the inside tool has been adjusted by bodily moving the tool support 20, the outside cutting tool T' is adjusted with reference to the inside cutting tool by adjustment of the block 70 on the wedge block 74. This adjusts the tool T' at a greater or less distance from the arm 50. It is effected by loosening the bolt 77 and rotating the nuts 83.

The arms 35 and 50 must also be positioned so as to cut at the proper points circumferentially of the blank G. This is done by loosening the nuts 24 on the studs 22 and rotating the adjusting screw 25 and by sliding the whole support 20 laterally on the head base 14. The bolts 138 slide in slots 139 for the purpose of the latter adjustment.

When the inside cutting tool has been properly positioned, the outside cutting tool T' is adjusted so as to be spaced at the proper distance from the tool T circumferentially around the gear blank to chamfer an opposite side tooth surface of the blank. This latter adjustment is effected by loosening the bolt 77 and sliding the wedge block 74 bodily in the groove 76 of the arm 50.

The position about the center of the gear of the axes of swing of the two tools depends, of course, upon the spiral angle of the teeth of the gear. In general, the chamfering tools are adjusted so that they cut in directions oblique to the sides and adjacent ends of the tooth surfaces, thereby to remove the offending corners of the teeth.

The chamfering tools can be adjusted angularly in accordance with the pressure angles of the tooth sides to be chamfered by rotatably adjusting the tools in the holes or sockets in which they are mounted on the arms 35 and 50, respectively.

For the purpose of manually rocking the tools, as when setting up a machine, a bar 140 may be provided. This can readily be inserted in a socket 142 in the arm 105 to manipulate the arm.

While the invention has been described in connection with a particular embodiment and a particular use therefor, it is to be understood that the invention is capable of various other embodiments and uses. If embodied in a machine on which chamfering alone is to be done, in addition to the chamfering mechanism and to the means for actuating the same, only a work support and means for indexing the same on the return strokes of the chamfering tools are required. This application is intended, in general, to cover any variations, uses, or adaptations of the invention following the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In mechanism for chamfering the teeth of a tapered gear, a work support, a pair of movable arms, a tool secured in each arm, each of said tools being adapted to cut on movement inwardly from an end face of a tooth of the gear, and means for simultaneously actuating said arms to cause these tools to chamfer simultaneously opposite ends of teeth of a gear mounted on said work support.

2. In mechanism for chamfering the teeth of a tapered gear, a work support, a pair of swinging arms, a tool secured in each arm adapted to cut on movement inwardly from one end face of a tooth, and means for simultaneously oscillating said arms in opposite directions to simultaneously chamfer opposite end faces of the teeth of a gear mounted on said work support.

3. In mechanism for chamfering the teeth of a tapered gear, a work support, a pair of movable arms, a chamfering tool mounted in each arm, means for positioning said tools so that their cutting edges are approximately perpendicular to the root plane of the gear to be chamfered, and means for simultaneously actuating said tool arms to cause the tools to chamfer simultaneously opposite end faces of teeth of a gear mounted on said work support.

4. In mechanism for chamfering the teeth of a tapered gear, a work support, a pair of oscillatable arms, a chamfering tool mounted in each arm, means for positioning said tool arms to swing about separate axes approximately perpendicular to the root plane of the gear to be chamfered, and means for simultaneously swinging said arms to cause the tools to chamfer simultaneously opposite end faces of teeth of a gear mounted on said work support.

5. In mechanism for chamfering the teeth of a tapered gear, a work support, a pair of oscillatable arms, a chamfering tool mounted in each arm and adapted to cut on movement inwardly from an end face of a tooth, means for positioning said tool arms to swing about separate axes approximately perpendicular to the root plane of the gear to be chamfered, an actuating member, link mechanism connecting said actuating member to each arm to cause said arms to be swung simultaneously in opposite directions on oscillation of said actuating member to chamfer simultaneously opposite end faces of teeth of a gear mounted on the work support, and means for oscillating said actuating member.

6. The combination in a gear cutting machine of tool mechanism for cutting tooth spaces of the blank and chamfering mechanism operable alternately with said tool mechanism and adapted to chamfer opposite ends of the teeth bounding said tooth spaces at opposite sides thereof, said chamfering mechanism comprising a pair of oscillatable tools adapted to cut on movement from the ends of the gear inwardly, and means for simultaneously swinging said tools in opposite directions about axes approximately perpendicular to the root plane of the blank and in paths oblique to opposite sides of the teeth to cause said tools to effect the chamfering cut.

7. The combination in a gear cutting machine for cutting longitudinally curved tooth tapered gears, of tool mechanism for cutting the tooth spaces of the gear and chamfering mechanism operable alternately with said tool mechanism and adapted to chamfer simultaneously opposite ends of the teeth bounding said tooth spaces at opposite sides thereof, said chamfering mechanism comprising a pair of oscillatable tools adapted to cut on movement in opposite directions, said tools being adjustable so that one is adapted to swing about an axis perpendicular to the root plane of the gear in a path oblique to the convex side surface of a tooth space at one end thereof and the other is adapted to swing about an axis inclined slightly to the axis of the first tool and in a path oblique to a concave side surface of a tooth space at the opposite end thereof, and means for simultaneously swinging said tools to effect the chamfering operation.

8. Mechanism for chamfering opposite ends of the teeth of longitudinally curved tooth gears, comprising a pair of oscillatable tools adapted to cut on movement in opposite directions, said tools being adjustable so that one is adapted to swing in a path oblique to a concave side surface of a tooth space at one end thereof and the other is adapted to swing in a path oblique to a convex side surface of a tooth space at the opposite end thereof, and means for simultaneously swinging said tools to effect the chamfering operation.

9. Mechanism for chamfering opposite ends of the teeth of longitudinally curved tooth gears comprising a pair of oscillatable tools adapted to cut on movement in opposite directions, said tools being adjustable to cut simultaneously at opposite sides of the same tooth space of a gear and being adjustable, also, to cut about axes approximately perpendicular to the root plane of the blank and lying on the same side of the axis of the blank, and being adjustable, also, to cut in paths inclined, respectively, to opposite sides of the tooth spaces of the blank, and means for oscillating said tools to effect the chamfering operation.

10. Mechanism for chamfering opposite ends of the teeth of longitudinally curved tooth gears comprising a work support, a base, a tool support mounted on the base, a pair of arms mounted on the tool support for swinging movement thereon, means for adjusting said arms bodily on the tool support and the tool support on the base to position the axes of swing of said arms at the desired points circumferentially of the gear in accordance with the spiral angle, cone distance and face width of the teeth of the gear to be chamfered, chamfering tools adapted to be secured to each arm, each of said tools being rotatably adjustable in its arms and one of said tools being adjustable radially of the axis of swing of its arms and laterally of said arm, and means for swinging said tools simultaneously to effect the chamfering operation.

11. In mechanism for chamfering opposite ends of teeth of a tapered gear which has longitudinally inclined teeth, a work support, a pair of tool arms, tools mounted on said arms adapted to cut, respectively, on movement in opposite directions, means for positioning said arms so that each tool cuts in a direction oblique to a side and an end face of a tooth, and means for actuating said tools to cut simultaneously opposite ends of teeth of a gear mounted on said work support.

12. In a machine for chamfering a tapered gear which has longitudinally inclined teeth, a work support, a pair of oscillatable tool arms, tools mounted on said arms, means for adjusting the tool arms and work support relative to one another so that the axes about which the tools swing are approximately perpendicular to the root plane of the teeth of the gear and each tool cuts in a direction oblique to a side and an end face of a tooth, and means for actuating the tools to chamfer simultaneously opposite ends of the teeth of a gear mounted on said work support.

13. Mechanism for chamfering the teeth of tapered gears having longitudinally inclined teeth comprising a pair of swinging arms, chamfering tools mounted in said arms in opposed relation to one another to cut on movement of said arms toward one another, means for adjusting said arms so that the tools when swung will cut, respectively, along paths inclined to opposite end faces and opposite sides of teeth of a gear, and means for simultaneously actuating said arms to effect the chamfering operation.

MAXWELL H. HILL.